(12) United States Patent
Tanaka

(10) Patent No.: US 9,375,977 B2
(45) Date of Patent: Jun. 28, 2016

(54) VEHICLE WHEEL

(71) Applicant: WORK CO., LTD., Higashiosaka (JP)

(72) Inventor: Takeshi Tanaka, Higashiosaka (JP)

(73) Assignee: WORK CO., LTD., Higashiosaka-shi (JP)

( * ) Notice: Subject to any disclaimer, the term of this patent is extended or adjusted under 35 U.S.C. 154(b) by 0 days.

(21) Appl. No.: 14/452,891

(22) Filed: Aug. 6, 2014

(65) Prior Publication Data

US 2015/0061354 A1    Mar. 5, 2015

(30) Foreign Application Priority Data

Aug. 29, 2013  (JP) ................................. 2013-178305

(51) Int. Cl.
*B60B 3/10* (2006.01)
*B60B 3/00* (2006.01)
*B60B 3/02* (2006.01)

(52) U.S. Cl.
CPC . *B60B 3/005* (2013.01); *B60B 3/00* (2013.01);
*B60B 3/02* (2013.01); *B60B 3/10* (2013.01);
*B60B 2900/111* (2013.01); *B60B 2900/541*
(2013.01); *B60B 2900/572* (2013.01)

(58) Field of Classification Search
CPC ............ B60B 3/00; B60B 3/005; B60B 3/02; B60B 3/04; B60B 3/10
USPC ...................... 301/64.101, 64.102, 64.203, 67
See application file for complete search history.

(56) References Cited

U.S. PATENT DOCUMENTS 5,879,059 A * 3/1999 Heiler ...................... B60B 1/06
301/64.102

FOREIGN PATENT DOCUMENTS

JP          4896163 B2      3/2012

* cited by examiner

*Primary Examiner* — John Walters
(74) *Attorney, Agent, or Firm* — Kratz, Quintos & Hanson, LLP

(57) ABSTRACT

Provided is a one piece vehicle wheel capable of obtaining design having a high-class feeling, improving the cleaning property, reducing the weight, and easily adjusting the weight balance without deteriorating the design. A one piece type vehicle wheel 1 is provided with a cylindrical rim 2, a disk 3 provided inside the rim 2, and a plurality of spokes 7 each of which extends from the central part of the disk 3 toward the rim 2 and has an outer end connected to the rim. A boundary groove 23 is formed on a design surface side of the vehicle wheel 1 along the boundary between the rim 2 and each of the spokes 7.

7 Claims, 6 Drawing Sheets

VEHICLE WHEEL

TECHNICAL FIELD

The present invention relates to a vehicle wheel made of light metal.

BACKGROUND ART

As a vehicle wheel made of light metal such as an aluminum alloy and a magnesium alloy, there have been widely put to practical use three kinds of vehicle wheels, specifically, a one piece type vehicle wheel which is formed as an integrally molded article as a whole, a two piece type vehicle wheel which includes two components, specifically, a cylindrical rim and a disk which is attached to the inside of the rim, and a three piece type vehicle wheel which includes three components, specifically, a cylindrical inner rim, a cylindrical outer rim, and a disk which is attached to the inside of the connected part between the rims.

Advantageously, the one piece type wheel has higher strength and rigidity than the two piece type wheel or the three piece type wheel, and can be manufactured at low cost. However, disadvantageously, adjustment of the offset amount of the disk is not easy in the one piece type wheel, and the one piece type wheel has inferior design.

Since a vehicle wheel has not only a function as a wheel, but also a large influence on the design of a vehicle, vehicle wheels of various designs have been proposed. For example, there have been proposed a vehicle wheel that is configured to have a high-class feeling by attaching a decorative pierce bolt to a rim of a one piece wheel so as to be decorated like a two piece wheel or a three piece wheel and a vehicle wheel that is manufactured in such a manner that the entire spoke of the vehicle wheel is coated with a coating material having a first color, the side surface of the spoke is then partially shaved to allow a metal surface to be exposed, and a color clear coating material having a second color that allows the first color to appear substantially as it is when being applied to a region which is coated with the first-color coating material and clearly appears when being applied to a region in which the metal surface is exposed is further applied to the entire spoke including the exposed metal surface (see Patent Document 1, for example).

CITATION LIST

Patent Literature

Patent Document 1: Japanese Patent No. 4896163

SUMMARY OF INVENTION

Technical Problem

However, when a pierce bolt is attached to a one piece wheel, disadvantageously, the manufacturing cost is increased by the attached pierce bolt, and foreign substances enter an attachment hole formed on the wheel for the pierce bolt, thereby deteriorating the cleaning property.

It is an object of the present invention to provide a one piece vehicle wheel capable of obtaining design having a high-class feeling, improving the cleaning property, reducing the weight, and easily adjusting the weight balance without deteriorating the design.

Solution to Problem

A vehicle wheel of one piece type according to the present invention is provided with a cylindrical rim; a disk provided inside the rim; a plurality of spokes formed on the disk, the spokes each extending from a central part of the disk toward the rim and having an outer end connected to the rim; and a boundary groove formed on a design surface side of the vehicle wheel along the boundary between the rim and each of the spokes.

This vehicle wheel has an appearance as if the disk and the rim are separated from each other, that is, an appearance like a two piece type or three piece type vehicle wheel by virtue of the boundary groove formed along the boundary between the rim and each of the spokes. Therefore, it is possible to obtain design that gives a high-class feeling like one obtained by a two-piece type or three piece type vehicle wheel to a user even by the one piece type vehicle wheel. Further, the cleaning property of the boundary groove can be ensured by increasing the width of the boundary groove. Further, the weight reduction of the wheel can be achieved by virtue of the boundary groove. Further, the weight balance of the wheel can be adjusted without deteriorating the design by adjusting the depth of the boundary groove.

It is a preferred embodiment that the outer end of each of the spokes be connected to an outer flange of the rim. With such a configuration, the boundary groove is arranged on the design surface side of the wheel, and can therefore be easily visually observed. Therefore, the design of the wheel can be further improved.

It is also a preferred embodiment that an outer peripheral arc surface be formed on a design surface side of a base of the outer flange at a position between outer ends of adjacent ones of the spokes, the outer peripheral arc surface being arranged within a plane substantially perpendicular to a rotation axis of the vehicle wheel. With such a configuration, the outer peripheral arc surface is formed in a generally annular shape. Therefore, it is possible to strongly give a high-class feeling like one obtained by a two-piece type or three piece type vehicle wheel to a user. More specifically, in a two piece type or three piece type vehicle wheel, a ring which is fitted into a rim is formed on the outer peripheral part of a disk. However, in the above vehicle wheel, the outer peripheral arc surface has an appearance like a ring. Therefore, even the one piece type vehicle wheel can more strongly give a high-class feeling like one obtained by a two-piece type or three piece type vehicle wheel to a user by virtue of the outer peripheral arc surface.

It is a preferred embodiment that the boundary groove be formed to have an arc cross section. In this case, the cleaning property of the boundary groove can be further improved. Further, stress concentration in the connected part between the spokes and the rim can be prevented, and the strength of the wheel can be improved.

It is a preferred embodiment that the spokes be each formed to have a semicircular cross section. The spokes having such a cross-sectional shape have a large area on the design surface side. Therefore, decoration on the spokes can largely change the design of the wheel.

Coating as described below can also be applied to the vehicle wheel. In this specification, color coating means coating using an opaque coating material having a color such as black, white, blue, red, and silver, and clear coating means coating using a colorless and transparent coating material or a colored and transparent coating material having a red, blue, or yellow color.

It is also a preferred embodiment that, as the coating applied to the vehicle wheel, color coating be applied to at least a design surface of the vehicle wheel before forming the boundary groove therein, the boundary groove and the surface on a design surface side of the outer flange be then cut to allow a metal surface to be exposed, and clear coating be then applied to at least the design surface of the vehicle wheel. In this case, a clear coating film layer is formed on a metal surface on the design surface side of the boundary groove and the outer flange by the clear coating, and the texture of the metal surface can be visually observed through the clear coating film layer. On the other hand, on the other part on the design surface side, the clear coating film layer is arranged on a color coating film layer formed by the color coating in a laminated manner. Therefore, the texture of the color coating film layer can be visually observed through the clear coating film layer. In this manner, the disk and the rim are clearly divided by the coating, which also makes it possible to more strongly give a high-class feeling like one obtained by a two-piece type or three piece type vehicle wheel to a user.

Further, it is also a preferred embodiment that a center groove extending in the length direction of each of the spokes be formed on a central part in the width direction on a design surface side of each of the spokes, color coating be applied to at least a design surface of the vehicle wheel before forming the boundary groove and the center groove therein, the boundary groove, the center groove, and the surface on a design surface side of the outer flange be then cut to allow a metal surface to be exposed, and clear coating be then applied to at least the design surface of the vehicle wheel.

Further, it is also a preferred embodiment that side grooves extending in the length direction of each of the spokes be formed on both sides in the width direction on a design surface side of each of the spokes, color coating be applied to at least a design surface of the vehicle wheel before forming the boundary groove and the side grooves therein, the boundary groove, the side grooves, and the surface on a design surface side of the outer flange be then cut to allow a metal surface to be exposed, and clear coating be then applied to at least the design surface of the vehicle wheel.

Further, it is also a preferred embodiment that a center groove extending in the length direction of each of the spokes be formed on a central part in the width direction on a design surface side of each of the spokes, side grooves extending in the length direction of each of the spokes be formed on both sides in the width direction on a design surface side of each of the spokes, color coating be applied to at least a design surface of the vehicle wheel before forming the boundary groove, the center groove, and the side grooves therein, the boundary groove, the center groove, the side grooves, and the surface on a design surface side of the outer flange be then cut to allow a metal surface to be exposed, and clear coating be then applied to at least the design surface of the vehicle wheel.

Further, the surfaces of the boundary groove, the center groove, the side grooves, and the surface on the design surface side of the outer flange can be cut by machining using an end mill or the like. However, it is also possible that the boundary groove, the center groove, and the side grooves be previously formed before the color coating, and the inner surfaces of the grooves be cut with an end mill after the color coating to thereby allow the metal surface to be exposed.

Advantageous Effects of Invention

The vehicle wheel according to the present invention has an appearance as if the disk and the rim are separated from each other, that is, an appearance like a two piece type or three piece type vehicle wheel by virtue of the boundary groove formed along the boundary between the rim and each of the spokes. Therefore, it is possible to obtain design that gives a high-class feeling like one obtained by a two-piece type or three piece type vehicle wheel to a user even by the one piece type vehicle wheel. Further, the cleaning property of the boundary groove can be ensured by increasing the width of the boundary groove. Further, the weight reduction of the wheel can be achieved by virtue of the boundary groove. Further, the weight balance of the wheel can be adjusted without deteriorating the design by adjusting the depth of the boundary groove.

DESCRIPTION OF EMBODIMENTS

Hereinbelow, an embodiment of the present invention will be described with reference to the drawings.

Figure 1:
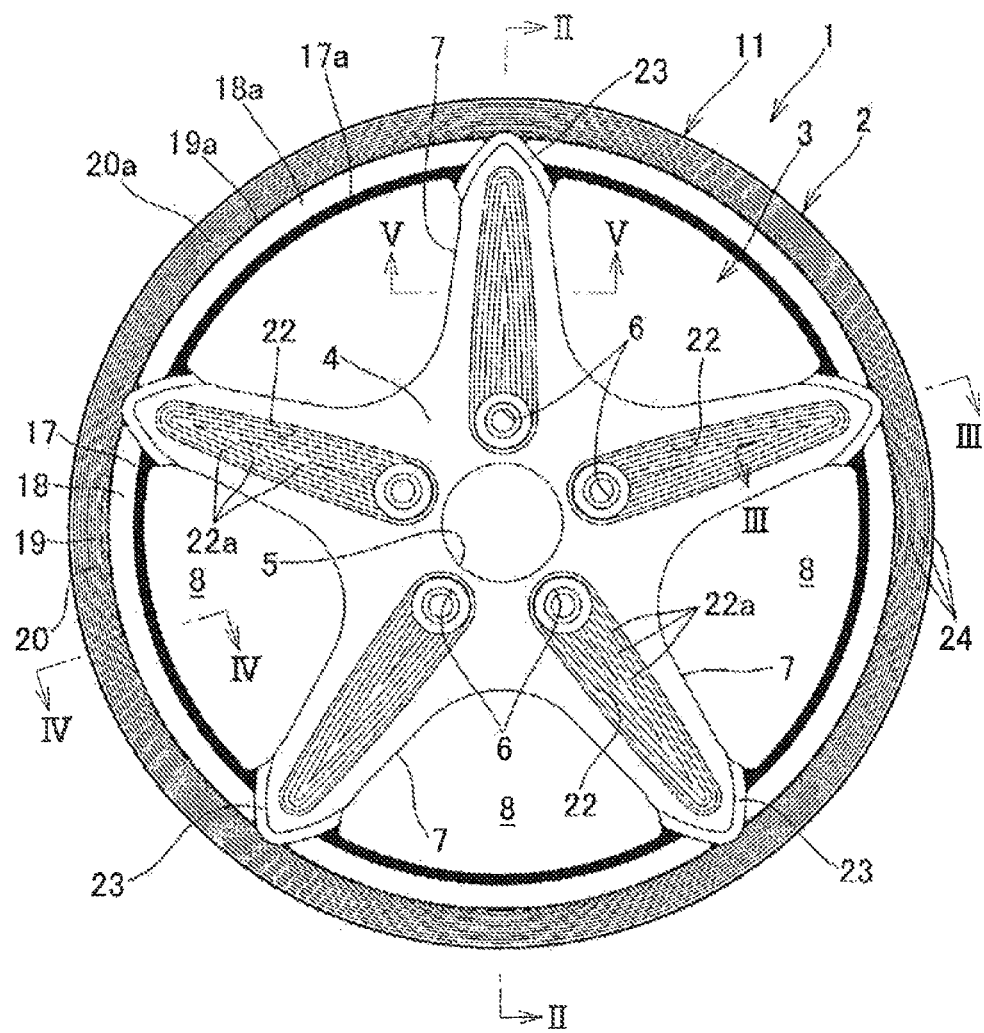
FIG. 1 is a front view of a vehicle wheel.
Figure 2:
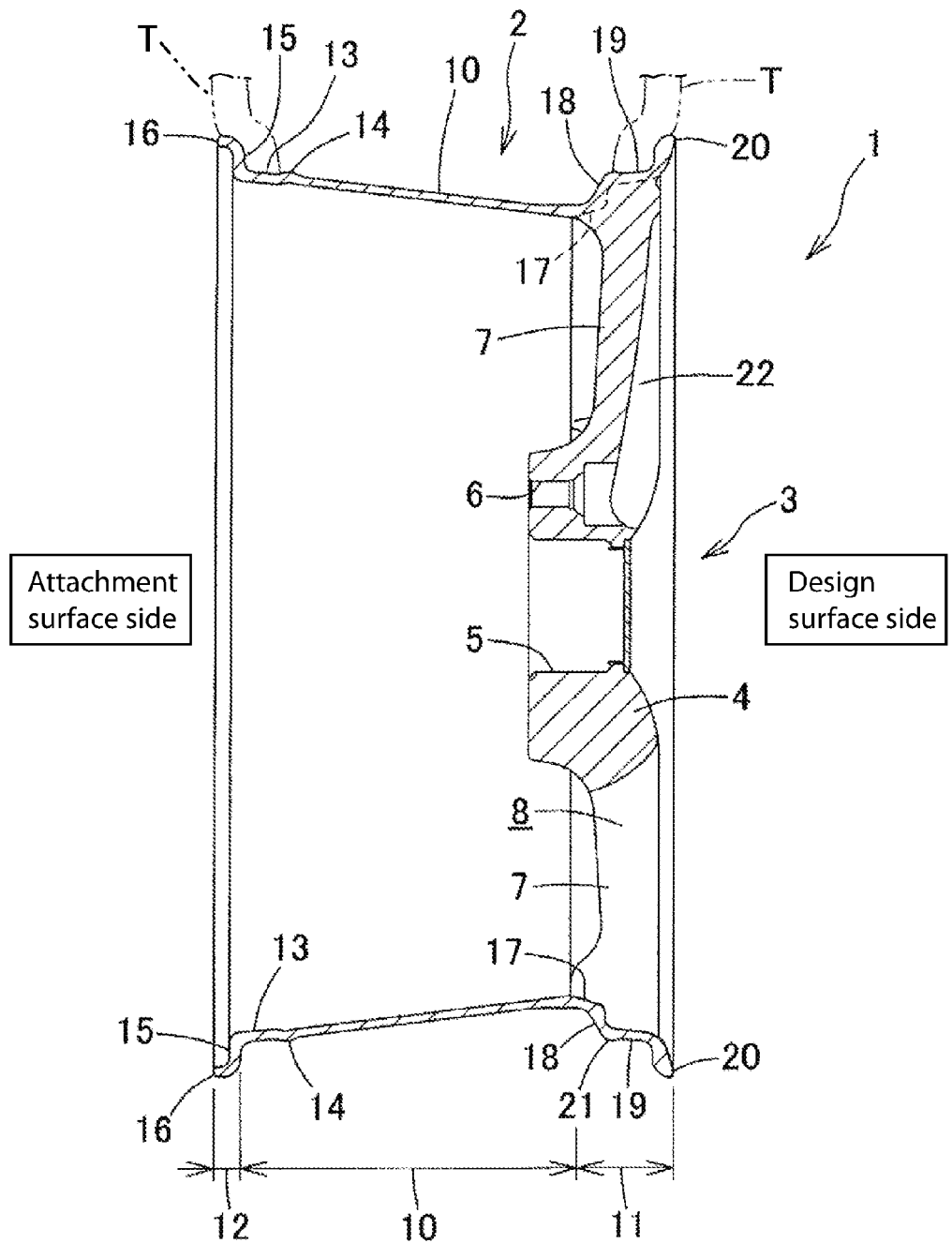
FIG. 2 is a cross-sectional view taken along line II-II of FIG. 1.

A vehicle wheel 1 illustrated in FIGS. 1 and 2 is a one piece type wheel. The vehicle wheel 1 is provided with a cylindrical rim 2 and a disk 3 which is provided inside the rim 2, wherein the rim 2 and the disk 3 are integrally molded by forging or casting using light metal such as an aluminum alloy and a magnesium alloy.

An attachment unit 4 which is attached to a wheel support member on a vehicle body side is formed on the central part of the disk 3. A center bore 5 is formed on the central part of the attachment unit 4. Further, five attachment holes 6 are formed on the outer peripheral part of the attachment unit 4 at equal intervals in the peripheral direction so as to surround the center bore 5.

Further, five spokes 7 which radially extend from the attachment unit 4 are formed on the disk 3 at equal intervals in the peripheral direction so as to correspond to the respective attachment holes 6. The outer ends of the spokes 7 are coupled to the inner surface of the rim 2. Triangular openings 8 are formed between respective adjacent ones of the spokes 7. The number of attachment holes 6 and the number of spokes 7 can be optionally set. Further, the arrangement positions in the peripheral direction of the attachment holes 6 and the spokes 7 can also be optionally set. For example, the attachment holes 6 can also be formed between the bases of respective adjacent ones of the spokes 7.

As illustrated in FIGS. 1 to 4, the rim 2 is provided with a cylindrical main body 10 whose diameter is gradually reduced from an attachment surface side (the inner side of the vehicle) toward a design surface side (the outer side of the vehicle), an outer flange 11 which is connected to a design surface side end of the main body 10, and an inner flange 12 which is connected to an attachment surface side end of the main body 10. A tire T is externally assembled to the outer peripheral part of the rim 2 at a position between a design surface side end of the outer flange 11 and an attachment surface side end of the inner flange 12.

An inner bead seat 13 is formed in an attachment surface side part of the main body 10. An attachment surface side inner peripheral edge of the tire T is externally fitted to the inner bead seat 13. An inner hump 14 which protrudes outward in the radial direction and has an arc cross section is annularly formed on the design surface side of the inner bead seat 13 over the entire periphery thereof.

The inner flange 12 includes an inner flange base 15 which extends outward in the radial direction from the attachment surface side end of the main body 10 and an inner flange free end 16 which extends toward the attachment surface side along an arc shape from the inner flange base 15. The attachment surface side inner peripheral edge of the tire T is held between the inner flange base 15 and the inner hump 14 so as to be immovable in the axial direction of the wheel 1.

The outer flange 11 includes an outer flange base 17 which extends from the design surface side end of the main body 10 toward the design surface side with its diameter gradually increasing, an outer flange step 18 which extends outward in the radial direction from a design surface side end of the outer flange base 17, a generally cylindrical outer bead seat 19 which extends from the outer end of the outer flange step 18 toward the design surface side, and an outer flange free end 20 which extends outward in the radial direction from a design surface side end of the outer bead seat 19.

An outer hump 21 which protrudes outward in the radial direction and has an arc cross section is annularly formed on the attachment surface side of the outer bead seat 19 over the entire periphery thereof. A design surface side inner peripheral edge of the tire T is held between the outer hump 21 and the outer flange free end 20 so as to be immovable in the axial direction of the wheel 1.

Figure 5:
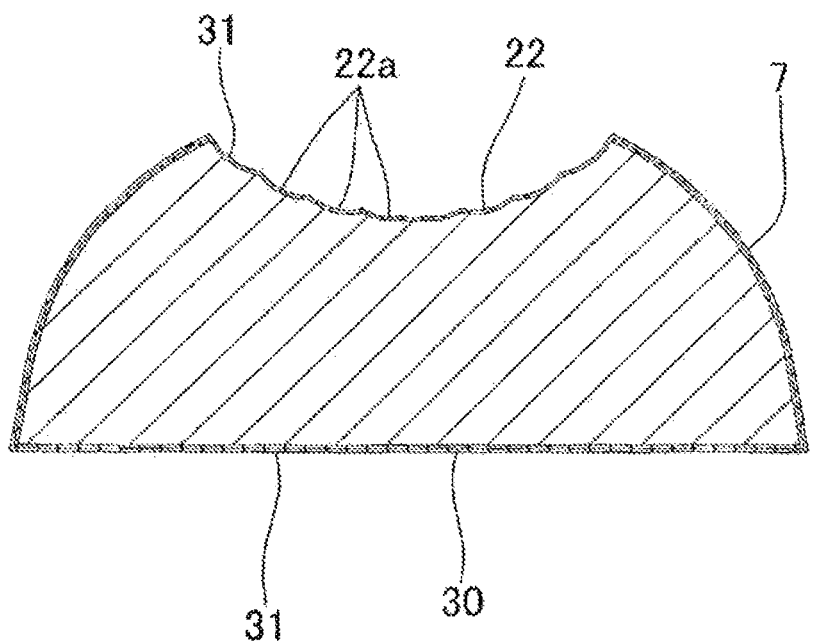
FIG. 5 is a cross-sectional view taken along line V-V of FIG. 1.

As illustrated in FIGS. 1 and 5, each of the spokes 7 is formed to have a generally semicircular cross section. Center grooves 22 are each formed on the central part in the width direction of the design surface side of the corresponding spoke 7. The center grooves 22 extend in a substantially radial direction from the respective attachment holes 6 up to positions near the rim 2. The cross-sectional shape of the spokes 7 can also be formed in any shape other than a semicircular shape such as an isosceles trapezoidal shape. Further, the width, the length, and the depth of the center grooves 22 can be appropriately set taking the design and the strength into consideration. The cross-sectional shape of the center grooves 22 can also be formed in a square shape such as a rectangular shape and an isosceles trapezoidal shape. However, in order to ensure the strength of the spokes 7, arc grooves are preferred. A plurality of fine linear grooves 22a each of which extends in the radial direction and has an arc cross section are formed on the inner surface of each of the center grooves 22 using an end mill.

Figure 3:
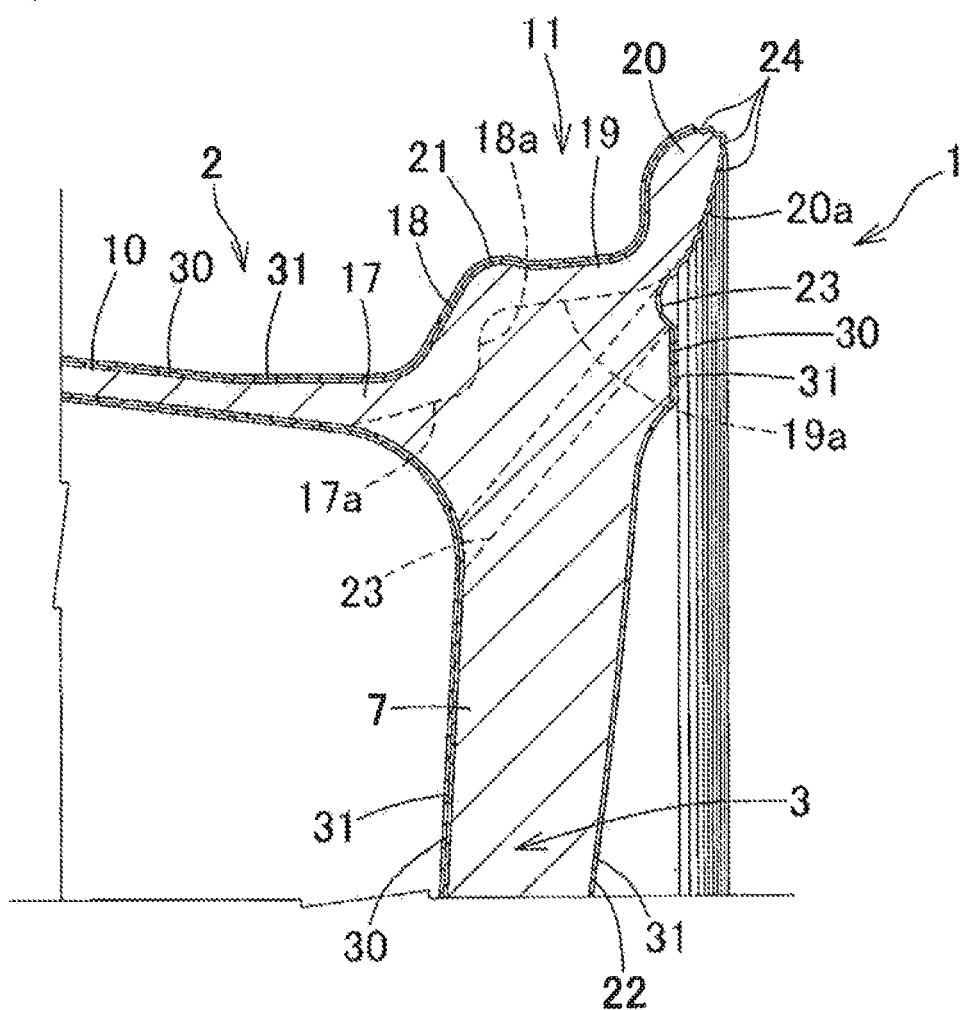
FIG. 3 is a cross-sectional view taken along line III-III of FIG. 1.
Figure 4:
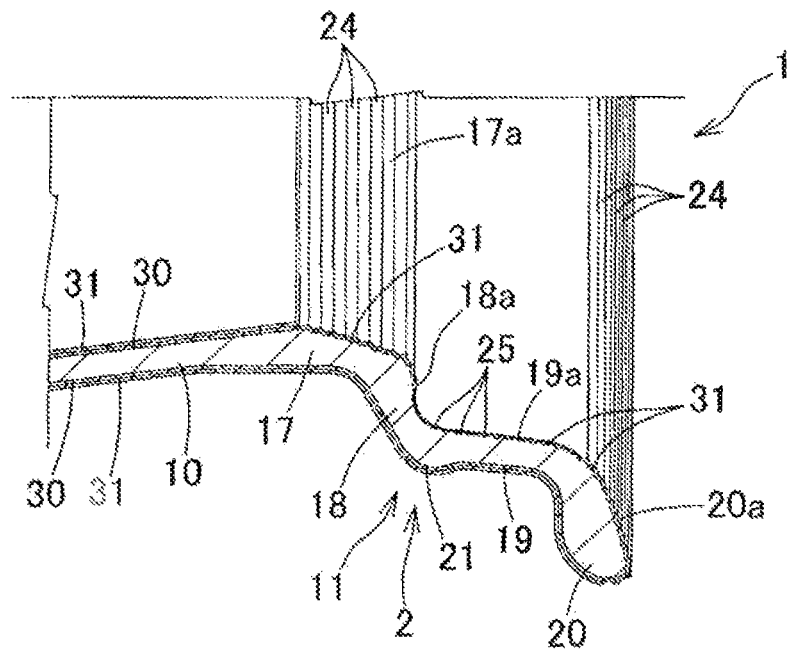
FIG. 4 is a cross-sectional view taken along line IV-IV of FIG. 1.

As illustrated in FIGS. 1 and 3, the outer ends of the spokes 7 are connected to the outer flange base 17 and an outer flange intermediate part of the rim 2. Further, boundary grooves 23 each having an arc cross section are formed on the boundaries between the respective spokes 7 and the rim 2 so as to have a generally V shape in a front view. The front shape of the boundary grooves 23 can be formed in any shape such as an arc shape, a U shape, and an isosceles trapezoidal shape depending on the cross-sectional shape of the spokes 7. The cross-sectional shape of the boundary grooves 23 can be formed in any cross-sectional shape such as a square shape, a U shape, and a V shape. However, in order to prevent stress concentration to thereby increase the connection strength between the spokes 7 and the rim 2 and improve the cleaning property of the boundary grooves 23, arc grooves are preferred. The width of the boundary grooves 23 is preferably set within the range of 5 to 10 mm, and the maximum depth thereof is preferably set within the range of 0.5 to 1.0 mm. The width of the boundary grooves 23 can be set to be uniform within each of the boundary grooves 23. Further, it is also possible to set the width of each of the boundary grooves 23 so as to have different widths depending on regions, for example, set the width so as to be maximum at the top of the V shape and reduced toward both ends thereof. Further, it is also possible to change the front shape, the groove width, and the depth between adjacent boundary grooves 23.

By forming the boundary grooves 23 in this manner, as illustrated in FIG. 1, the vehicle wheel 1 has an appearance like a two piece wheel or a three piece wheel as if the spokes 7 and the rim 2 are formed of different members. Therefore, even the one piece type vehicle wheel 1 can strongly give a high-class feeling like one obtained by a two piece type or three piece type vehicle wheel to a user.

As illustrated in FIGS. 1 to 4, a plurality of first fine linear grooves 24 each of which extends in the peripheral direction and has an arc cross section are formed on the inner peripheral surfaces of the outer flange base 17 and the outer flange free end 20 at a constant pitch with no gap therebetween using an end mill. Further, a base cut surface 17a and a free end cut surface 20a on which the first fine linear grooves 24 are formed are respectively formed on the inner peripheral surfaces of the outer flange base 17 and the outer flange free end 20. A plurality of second fine linear grooves 25 each of which is smaller than the first fine linear groove 24 and has an arc cross section are formed on the inner peripheral surfaces of the outer flange step 18 and the outer bead seat 19 at a constant pitch with no gap therebetween using an end mill. A partially-annular step cut surface 18a (corresponding to an outer peripheral arc surface) which includes the second fine linear grooves 25 formed thereon and is arranged within a plane substantially perpendicular to a rotation axis of the vehicle wheel 1 is formed on the design surface side of the outer flange step 18 at a position between the outer ends of adjacent spokes 7. Further, a partially-cylindrical seat cut surface 19a which includes the second fine linear grooves 25 formed thereon is formed on the inner peripheral surface of the outer bead seat 19 at a position between the outer ends of adjacent spokes 7.

The first fine linear grooves 24 and the second fine linear grooves 25 are formed by three-dimensionally controlling the movement of an end mill. Each of the first fine linear grooves 24 includes a linear cut scar having a depth of 0.1 to 5 mm and a width of 0.1 to 10 mm. Each of the second fine linear grooves 25 includes a linear cut scar having a depth of 0.001 to 0.5 mm and a width of 0.1 to 1.5 mm. The first fine linear grooves 24 and the second fine linear grooves 25 can be easily distinguished by visual observation. Further, a part other than the step cut surface 18a of the inner peripheral surface of the outer flange 11 can have any structure as long as at least the step cut surface 18a can be clearly distinguished by visual observation. For example, it is also possible to form the first fine linear grooves 24 on the seat cut surface 19a instead of the second fine linear grooves 25, or not to cut the inner peripheral surfaces of the outer flange base 17 and the outer flange free end 20. Further, the base cut surface 17a, the step cut surface 18a, the seat cut surface 19a, and the free end cut surface 20a can also be formed by optionally combining a cut surface including the first fine linear grooves 24 or the second fine linear grooves 25 and a cut surface having another configuration.

By forming the step cut surface 18a and the seat cut surface 19a on which the second fine linear grooves 25 are formed in this manner, particularly, forming the step cut surface 18a, as illustrated in FIG. 1, even the one piece type vehicle wheel 1 can strongly give a high-class feeling like one obtained by a two-piece type or three piece type vehicle wheel to a user.

More specifically, in a two piece type or three piece type vehicle wheel, a ring which is fitted into a rim is formed on the outer peripheral part of a disk. However, in the vehicle wheel 1, the step cut surface 18*a* and the seat cut surface 19*a* have an appearance like a ring. Therefore, even the one piece type vehicle wheel 1 can more strongly give a high-class feeling like one obtained by a two piece type or three piece type vehicle wheel to a user by virtue of the step cut surface 18*a* and the seat cut surface 19*a*. In the present embodiment, both ends of each of the boundary grooves 23 are arranged on the inner side with respect to the rim 2. However, the both ends of each of the boundary grooves 23 can also be smoothly continuous with the step cut surface 18*a*.

Coating can be performed on the wheel 1 by the following coating method.

First, a wheel that does not have the boundary grooves 23 and the center grooves 22 is manufactured by casting or forging. Then, color coating is applied to at least the design surface side of the wheel using an opaque coating material having a desired color such as black, white, blue, red, and silver to thereby form a color coating film layer 30. Then, the boundary grooves 23 and the center grooves 22 are formed by cutting using an end mill or the like to thereby allow a metal surface to be exposed on the inner surface of each of the boundary grooves 23 and the center grooves 22. Further, cutting is performed on the entire inner peripheral surface of the outer flange 11 using an end mill or the like to form the first fine linear grooves 24 and the second fine linear grooves 25 to thereby allow the metal surface to be exposed. Further, the boundary grooves 23 and the center grooves 22 may be formed at the time of forming the wheel 1, and the inner surfaces of the boundary grooves 23 and the center grooves 22 may be cut by cutting using an end mill or the like after the coating using an opaque coating material to thereby allow the metal surface to be exposed.

Then, a colorless and transparent clear coating material or a colored and transparent clear coating material having a red, blue, or yellow color is applied to at least the design surface side of the wheel to thereby form a clear coating film layer 31. In this manner, the wheel 1 coated in two colors is obtained.

In the wheel 1 coated by this coating method, the color coating film layer 30 can be visually observed through the clear coating film layer 31 in a first coating part in which the opaque coating material and the clear coating material are coated to overlap with each other, and the metal surface can be visually observed through the clear coating film layer 31 in a second coating part in which only the clear coating material is coated. Therefore, the wheel 1 can be separately coated in two colors without performing masking processing. Further, the entire inner peripheral surface of the outer flange 11 which constitutes a part of the rim 2 and the boundary grooves 23 are included in the second coating part, and the disk 3 on the inner side thereof is included in the first coating part. Therefore, even the one piece type vehicle wheel 1 can give a high-class feeling like one obtained by a two-piece type or three piece type vehicle wheel to a user.

Figure 6:
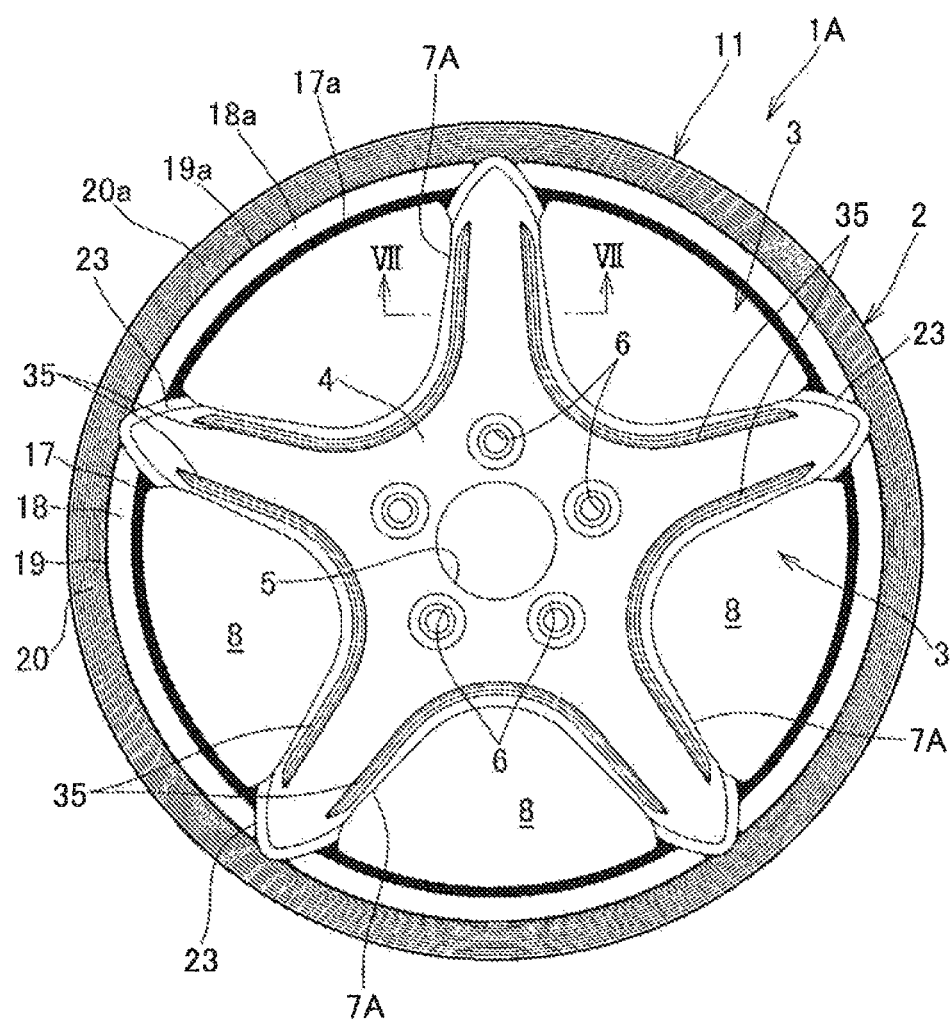
FIG. 6 is a front view of a vehicle wheel having another configuration.
Figure 7:
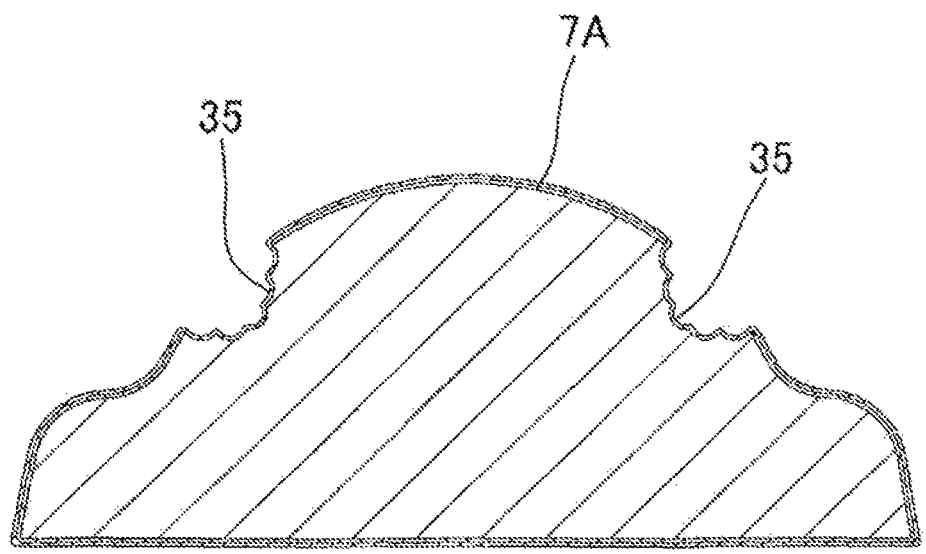
FIG. 7 is a cross-sectional view taken along line VII-VII of FIG. 6.

Although it is preferred to form the center grooves 22 in order to improve the design of the wheel 1, the center grooves 22 can also be omitted. Further, side grooves each of which extend in the length direction of the corresponding spoke can also be formed instead of the center grooves 22 or together with the center grooves 22. For example, as in a wheel 1A illustrated in FIGS. 6 and 7, a pair of side grooves 35 can be formed on both sides in the width direction of the design surface side of a spoke 7A having an arc cross section. When applying coating to the wheel 1A, the coating can be applied in the same manner as above by replacing the term "center grooves 22" in the above coating method with the term "side grooves 35".

Hereinabove, the embodiment of the present invention has been described. However, it is needless to say that the present invention is not limited, at all, to the above embodiment, and the configuration thereof can be modified without departing from the scope of the invention.

REFERENCE SIGNS LIST

1 Vehicle wheel
2 Rim
3 Disk
4 Attachment unit
5 Center bore
6 Attachment hole
7 Spoke
8 Opening
10 Main body
11 Outer flange
12 Inner flange
13 Inner bead seat
14 Inner hump
15 Inner flange base
16 Inner flange free end
17 Outer flange base
17*a* Base cut surface
18 Outer flange step
18*a* Step cut surface
19 Outer bead seat
19*a* Seat cut surface
20 Outer flange free end
20*a* Free end cut surface
21 Outer hump
22 Center groove
22*a* Fine linear groove
28 Boundary groove
24 First fine linear groove
25 Second fine linear groove
30 Color coating film layer
31 Clear coating film layer
1A Wheel
7A Spoke
36 Side groove
T Tire

The invention claimed is:

1. A one piece style vehicle wheel, comprising:
a cylindrical rim;
a disk provided inside the rim;
a plurality of spokes formed on the disk, the spokes each extending from a central part of the disk toward the rim and having an outer end connected to the rim;
the outer end of each of the spokes is connected to an outer flange of the rim;
a boundary groove formed on a design surface side of the vehicle wheel along the boundary between the rim and each of the spokes; and
an outer peripheral arc surface is formed on a design surface side of a base of the outer flange at a position between outer ends of adjacent ones of the spokes, the outer peripheral arc surface being arranged within a plane substantially perpendicular to a rotation axis of the vehicle wheel.

2. The vehicle wheel according to claim 1,
wherein the boundary groove is formed to have an arc cross section.

3. The vehicle wheel according to claim 1,
wherein the spokes are each formed to have a semicircular cross section.

4. The vehicle wheel according to claim 1,
wherein color coating is applied to at least a design surface of the vehicle wheel before forming the boundary groove therein, the boundary groove and the surface on a design surface side of the outer flange are then cut to allow a metal surface to be exposed, and clear coating is then applied to at least the design surface of the vehicle wheel.

5. The vehicle wheel according to claim 1,
wherein a center groove extending in the length direction of each of the spokes is formed on a central part in the width direction on a design surface side of each of the spokes, color coating is applied to at least a design surface of the vehicle wheel before forming the boundary groove and the center groove therein, the boundary groove, the center groove, and the surface on a design surface side of the outer flange are then cut to allow a metal surface to be exposed, and clear coating is then applied to at least the design surface of the vehicle wheel.

6. The vehicle wheel according to claim 1,
wherein side grooves extending in the length direction of each of the spokes are formed on both sides in the width direction on a design surface side of each of the spokes, color coating is applied to at least a design surface of the vehicle wheel before forming the boundary groove and the side grooves therein, the boundary groove, the side grooves, and the surface on a design surface side of the outer flange are then cut to allow a metal surface to be exposed, and clear coating is then applied to at least the design surface of the vehicle wheel.

7. The vehicle wheel according to claim 1,
wherein a center groove extending in the length direction of each of the spokes is formed on a central part in the width direction on a design surface side of each of the spokes, side grooves extending in the length direction of each of the spokes are formed on both sides in the width direction on a design surface side of each of the spokes, color coating is applied to at least a design surface of the vehicle wheel before forming the boundary groove, the center groove, and the side grooves therein, the boundary groove, the center groove, the side grooves, and the surface on a design surface side of the outer flange are then cut to allow a metal surface to be exposed, and clear coating is then applied to at least the design surface of the vehicle wheel.

\* \* \* \* \*